United States Patent [19]

Taylor

[11] 4,094,334
[45] June 13, 1978

[54] OCEAN THERMAL ENERGY CONVERSION VALVE

[76] Inventor: Julian S. Taylor, 8300 SW. 8, Oklahoma City, Okla. 73108

[21] Appl. No.: 809,345

[22] Filed: Jun. 23, 1977

[51] Int. Cl.² .............................................. F16K 31/46
[52] U.S. Cl. .................................. 137/219; 137/236 R; 251/11; 251/282; 251/294; 251/339
[58] Field of Search ................ 137/219, 236; 166/332; 251/11, 294, 339, 282

[56] References Cited

U.S. PATENT DOCUMENTS

| 2,516,996 | 8/1950 | Jensen | 251/282 X |
| 2,759,699 | 8/1956 | Rush | 251/282 X |

FOREIGN PATENT DOCUMENTS

| 473,538 | 3/1929 | Germany | 137/219 |
| 653,266 | 5/1951 | United Kingdom | 137/219 |

*Primary Examiner*—Alan Cohan
*Assistant Examiner*—Gerald A. Michalsky
*Attorney, Agent, or Firm*—Robert K. Rhea

[57] ABSTRACT

A fluid flow control valve to be interposed in the depending end portion of a large diameter casing projecting downwardly below the ocean thermocline and forming a cold water passageway for moving water to the surface. The valve includes a jacket surrounding the casing and spanning a transverse partition and ports in the casing wall above the partition. A control line supported sleeve valve, having a length at least equal to the spacing between the partition and upper limit of the casing ports, is coaxially disposed in the casing and includes upper and lower floatation chambers slidably contacting the inner surface of the casing wall and spaced-apart a distance at least as great as the vertical extent of the casing ports. Inflatable seals, surrounding the floatation chambers, are selectively inflated with the floatation chambers to provide buoyancy and for opening and closing the passageway in accordance with the position of the sleeve valve.

6 Claims, 5 Drawing Figures

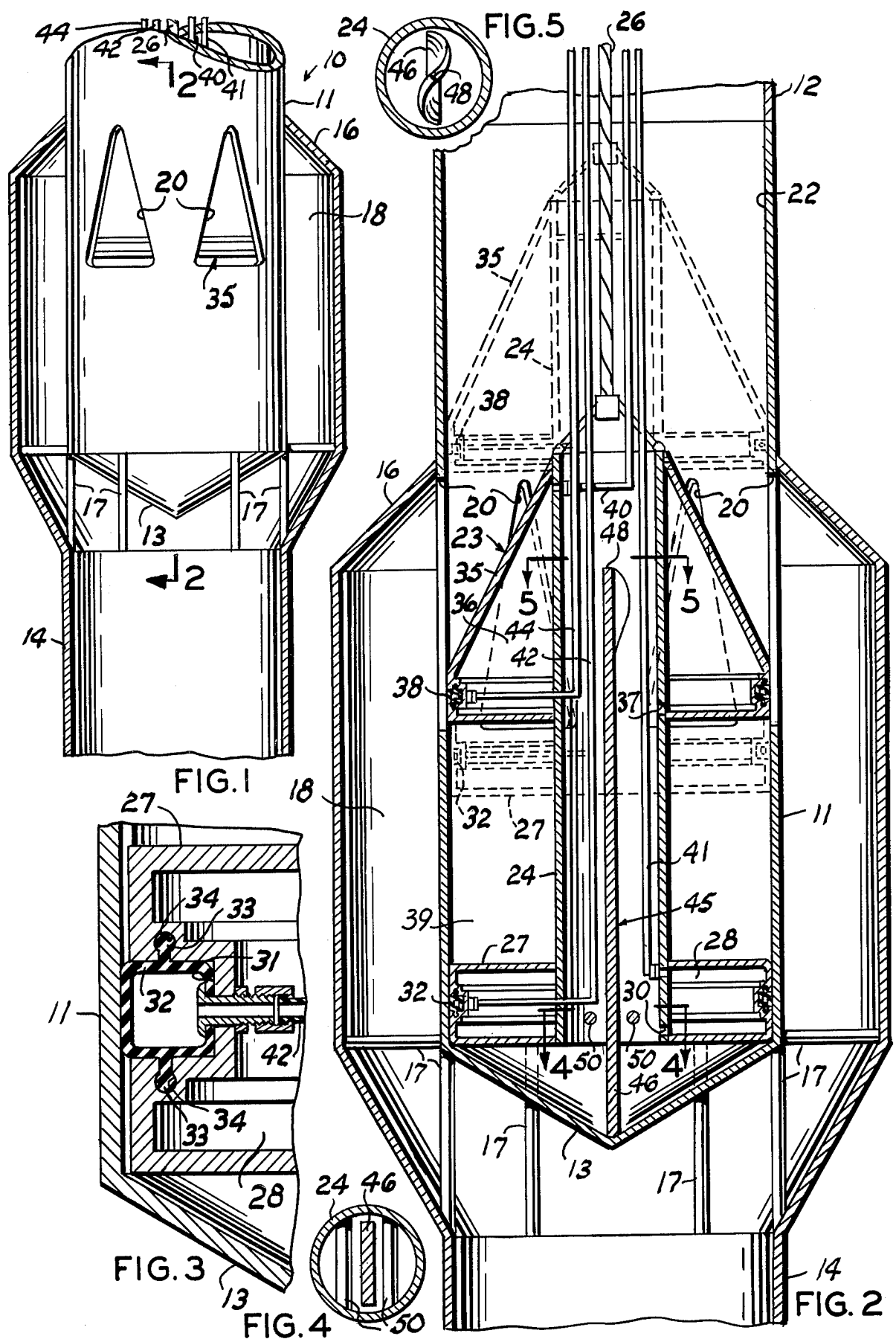

OCEAN THERMAL ENERGY CONVERSION VALVE

BACKGROUND OF THE INVENTION

1. Field of the Invention

The present invention relates to large diameter gate valves and remote operation of controls therefor.

It has been proposed to harness ocean thermal energy by utilizing an economic nonpolluting power source comprising a heat engine which uses warm ocean surface water as the heat source and the cold subsurface water as a heat sink for converting thermal energy to electrical energy. From an economical point of view it is necessary that a bank of such heat engines be operated to justify the cost of installation and operation thus requiring a relatively large volume of cold sea water to be pumped to the surface for cooling or condensing a gas after driving a turbine for recirculation and vaporization of the gas by warm ocean surface water for again driving the turbine in an endless cycle. A proposed diameter of the casing, for obtaining the cold sea water, is approximately 40 feet (12.50 meters). Since the large diameter casing must extend downwardly into the ocean a depth of 1500 feet or more some means must be provided in the depending end portion of the casing for opening and closing its passageway.

SUMMARY OF THE INVENTION

The depending end of an upper submerged vertically disposed casing is coaxially connected with an equal diameter inner tube having a bottom end wall closing the upper casing passageway. The tube is provided with a plurality of wall ports, at least equal in area to its transverse cross section area, spaced upwardly from its closed end. A lower section of casing is connected with the depending end portion of the inner tube in axially aligned relation by a surrounding jacket. The upper end of the jacket is connected with the inner tube above the upper limit of its wall ports. The annulus, formed by the jacket around the inner tube, being at least equal in transverse area to the transverse area of either casing.

A sleeve valve comprising an elongated open end sleeve, having a length at least as great as the spacing between the upper limit of the inner tube ports and its closed end, is coaxially disposed within the inner tube. A hollow ring member horizontally surrounds the depending end portion of the sleeve within the inner tube and forms a floatation chamber. A conical-shaped upper ring member, having an altitude substantially equal with respect to the vertical limit of the wall ports, surrounds the upper end portion of the sleeve to form an upper floatation chamber. The spacing between the ring members being at least slightly greater than the vertical limit of the inner tube ports. An inflatable seal, nested by a recess in the periphery of each of the ring members, forms a fluid tight seal, when inflated, with the inner wall surface of the inner tube. The sleeve is supported by a cable extending through the upper casing to the ocean surface for raising and lowering the sleeve valve and opening and closing the wall ports. Flexible tubing, extending downwardly through the passageway of the upper casing and the sleeve, supplies air pressure for inflating the seals and exhausting water out of the floatation chambers to provide buoyancy and a brake for raising and lowering the sleeve valve.

It is, therefore, the principal object of this invention to provide an ocean thermal energy conversion valve to be interposed in the depending end portion of large diameter casing having a fluid passageway opened and closed by remote control.

BRIEF DESCRIPTION OF THE DRAWINGS

FIG. 1 is a fragmentary vertical cross sectional view of the valve, partially in elevation;

FIG. 2 is a fragmentary vertical cross sectional view, to a larger scale, of the valve in open position taken substantially along the line 2—2 of FIG. 1 and illustrating its closed position by dotted lines;

FIG. 3 is a fragmentary vertical sectional view, to a further enlarged scale, illustrating the manner of supporting one of the valve seals; and, FIGS. 4 and 5 are horizontal sectional views taken substantially along the lines 4—4 and 5—5 of FIG. 2, respectively.

DESCRIPTION OF THE PREFERRED EMBODIMENTS

Like characters of reference designate like parts in those figures of the drawings in which they occur.

In the drawings:

The reference numeral 10 indicates the valve, as a whole, which is generally cylindrical in side elevation. The valve 10 includes an inner tube 11 integral with or coaxially connected at its upper end with the depending end of a submersed vertically disposed fluid conducing large diameter upper casing 12. The depending end of the inner tube 11 is closed by an end wall 13.

The numeral 14 indicates a depending continuation of the casing 12 joined to a jacket 16 surrounding the depending end portion of the inner tube 11 and suitably braced by rods 17, or the like, to form a rigid connection. The annulus 18, formed by the jacket 16, has a cross sectional area at least equal to the cross sectional area of the casing 12 for the reasons presently apparent.

The inner tube 11 is provided with a plurality of circumferentially spaced triangular-shaped wall ports 20 disposed above its closed end 13 and within the upper end portion of the jacket 16 to provide communication between the annulus 18 and the passageway or bore 22 of the inner tube 11. The combined area of the ports 20 is preferably greater than the cross sectional area of the inner tube 11 to permit unrestricted fluid flow from the passageway of the casing 14 into the inner tube.

Sleeve valve means 23 opens and closes the ports 20. The sleeve valve means 23 includes an elongated open end sleeve 24 coaxially disposed within the depending end portion of the inner tube 11 and supported from the ocean surface by a control cable 26. The length of the sleeve 24 is preferably at least twice the vertical height of the tube ports 20 for the reasons readily apparent. Adjacent its depending end, the sleeve 24 is horizontally surrounded and connected with a hollow ring-like member 27 forming a floatation chamber 28 having a drain port 30 in the sleeve wall. The ring member 27 is provided with a circumferential recess 31 for receiving an inflatable O-ring type lower seal 32 for the purposes presently explained. The purpose of the open end sleeve 24 is to permit vertical movement of the sleeve valve with respect to the inner tube 11 through the fluid therein and balance pressure above and below the moving valve element.

As shown by FIG. 3, the seal 32 is substantially square in transverse section having opposing coextensive anchor wings or tabs 33 nested by recesses 34 for securing the seal 32 in place and preventing a friction induced rolling action on the seal when the seal is moved relative to the inner wall surface of the inner tube.

The upper end portion of the sleeve 24 is surrounded and connected with a hollow substantially conical-shaped member 35 having a vertical height approximately equal with respect to the vertical limit of the ports 20 and forming an upper floatation chamber 36 similarly having a drain port 37 in the sleeve wall. The depending end portion of the conical-shaped member 35 is similarly surrounded by an annular groove for similarly receiving an identical O-ring type upper seal 38. When the sleeve valve 23 is in gate valve open position the depending limit of the conical member 35 is preferably disposed slightly above the lower limit of the ports 20 so that fluid fills the annulus 39 between the sleeve 24 and inner wall surface 22 of the inner tube 11. The spacing between the depending limit of the conical-shaped member 35 and the upper limit of the ring member 27 is at least greater then the vertical extent of the tube ports 20 for the reasons presently explained.

Flexible air pressure conducting tubes 40, 41, 42 and 44, coextensive with the control cable 26, are supplied with air under pressure through suitable controls at the ocean surface, not shown. The flexible tubes extend into the sleeve 24 and the tubes 40 and 41 are respectively connected with the chambers 36 and 28. The tube 42 is connected, through the wall of the sleeve 24, with the seal 32 in a substantially conventional manner (FIG. 3). The tube 44 is similarly connected with the seal 38.

Stabilizer means 45 prevents fluid induced angular rotation of the sleeve valve 23. The stabilizer means 45 comprises an elongated vertically disposed plate 46 secured at its depending end to the inner surface of the bottom end 13 and projecting centrally upward through the major depending end portion of the sleeve 24. The transverse width of the plate 46 is less than the inside diameter of the sleeve 24 and terminates at its upper end portion in a substantially one-half convolution of a single plate helix with the opposing edge surfaces of the plate being arcuately curved in outwardly bowed converging fashion to form a central pointed top or tip end 48 disposed intermediate the vertical extent of the ports 20. A pair of bars 50 are horizontally secured in parallel spaced relation to the inner wall surface of the depending end portion of the sleeve 24 on opposing sides of the plate 46 for preventing rotation of the sleeve valve with respect to the plate. The purpose of the single plate helical curved portion is to insure orientation of the bars 50 on opposing sides of the plate 46 when lowering the sleeve valve means into the inner tube 11 as presently explained. The spacing between the bars 50 is at least sufficient to accommodate the part helix curve of the plate 46 when removing or replacing the sleeve valve 23.

Operation

In operation the valve is normally disposed in the solid line open position of FIG. 2 which permits fluid flow upwardly from the passageway of the casing 14 through the jacket annulus 18, the ports 20 and into the passageway of the inner tube 11. The chambers 28 and 36 normally contain fluid which enters through the drain ports 30 and 37. When it is desired to interrupt fluid flow, by closing the ports 20, air under pressure is supplied to the chambers 28 and 36 through the flexible lines 40 and 41 which displaces the fluid in these chambers and provides buoyancy for the sleeve valve. The sleeve valve is lifted to its dotted line position by the cable 26, while simultaneously lifting the flexible tubes 40, 41, 42 and 44, until the lower and upper seals 32 and 38 are respectively disposed below and above the vertical limits of the ports 20, as shown by dotted lines (FIG. 2). During this action one or both seals 32 and 38 may be partially inflated to provide a braking action on the sleeve valve. Both seals 32 and 38 are then fully inflated for sealing against the inner wall surface of the inner tube 11 thus closing the fluid passageway.

When the valve is to be opened, air pressure within the chambers 28 and 36 is released through the tubes 40 and 41 at the ocean surface. The upper seal 38 is deflated by similarly releasing the air therein through the flexible tube 44 and the lower seal 32 is partially deflated through the tube 42 to act as a brake by frictional contact with the inner wall surface of the inner tube 11 during descent, by gravity, of the sleeve valve, the cable 26 and air tubes being lowered to permit movement of the sleeve valve to its solid line position of FIG. 2. The stabilizing means 45 prevents fluid flow induced rotation of the sleeve valve means 23 during the valve opening and closing action.

Obviously, the cable 26 and its control winch, not shown, must be capable of lifting the sleeve valve means 23 to the surface of the ocean for inspecting the seals 32 and 38. As the sleeve valve means 23 is lifted the bars 50, by contacting the plate helix, rotates the sleeve valve means through substantially 180° in a separating action between the sleeve 24 and the stabilizing means 45. Conversely, when the sleeve valve means 23 is lowered into the inner tube 11 the arcuate outer surfaces of the plate helix guide the bars 50 into alignment with the plane of the plate 46. Further, a shaft encoder, not shown, connected with the cable winch, is necessary to reveal the vertical position of the sleeve valve with respect to the tube ports as well as a weight indicator or sensor, not shown, on the capstan brake for indicating buoyancy provided by the chambers 28 and 36 so that, if the sleeve valve tends to float upwardly, air pressure may be applied to the seals 32 and 38 and form a braking action.

Obviously the invention is susceptible to changes or alterations without defeating its practicability. Therefore, I do not wish to be confined to the preferred embodiment shown in the drawings and described herein.

I claim:

1. A tubular gate valve interposed between upper and lower sections of casing, said upper casing having a depending end, comprising:
   a tube having a closed depending end and having an upper end at least diametrically equal with and coaxially connected with the depending end of said upper casing,
   said tube having a plurality of ports in its wall spaced above its closed end;
   tubular means connecting said tube with said lower casing for fluid communication therebetween through the tube ports;
   sleeve valve means including a sleeve within said tube and upper and lower hollow ring members surrounding and secured to said sleeve in vertically spaced relation for forming upper and lower floatation chambers each having a drain port and being slidably received by the inner wall surface of said tube, the spacing between said ring means being at least slightly greater than the vertical extent of the tube ports, for opening and closing the ports;

sealing means carried by said upper and lower ring members for sealing fluid tight with the inner wall surface of said tube; and, control means extending through said upper casing for moving said sleeve means.

2. The gate valve according to claim 1 in which said sealing means comprises:

a flexible inflatable endless tube-like seal.

3. The gate valve according to claim 2 in which said control means includes:

a cable connected with said sleeve; and, flexible tubing means connecting a source of air under pressure with said sealing means and the floatation chambers.

4. The gate valve according to claim 3 and further including:

stabilizer means within said sleeve for preventing angular rotation of said sleeve valve means about its vertical axis.

5. The gate valve according to claim 4 in which said stabilizing means comprises:

an elongated vertically disposed plate secured at its depending end to the inner surface of said tube closed end and projecting at its other end portion into said tube; and, a pair of bars horizontally secured to the depending end portion of said sleeve on opposing sides of said plate.

6. The gate valve according to claim 1 and further including:

stabilizer means for preventing rotation of said sleeve valve means about the vertical axis of said tube.

* * * * *